United States Patent
Shaffer

(10) Patent No.: US 6,988,524 B2
(45) Date of Patent: *Jan. 24, 2006

(54) APPARATUS FOR MAKING TIRES FILLED WITH FLATPROOFING MATERIAL

(75) Inventor: Charles A. Shaffer, Brookville, PA (US)

(73) Assignee: PC Industries, Brookville, PA (US)

( * ) Notice: Subject to any disclaimer, the term of this patent is extended or adjusted under 35 U.S.C. 154(b) by 433 days.

This patent is subject to a terminal disclaimer.

(21) Appl. No.: 09/924,535

(22) Filed: Aug. 9, 2001

(65) Prior Publication Data

US 2002/0020351 A1 Feb. 21, 2002

(51) Int. Cl.
B29C 45/00 (2006.01)
B29D 30/04 (2006.01)
B60C 17/00 (2006.01)
B60C 19/12 (2006.01)

(52) U.S. Cl. .................... 156/404; 156/110.1; 156/112; 156/394.1; 152/310; 152/516; 264/37.1; 264/911; 264/912

(58) Field of Classification Search ............... 264/37.1, 264/37.29, 911, 912; 156/404, 110.1, 112, 156/115, 421.2; 152/516, 520, 521, 310, 152/311
See application file for complete search history.

(56) References Cited

U.S. PATENT DOCUMENTS

| 1,049,939 | A | | 1/1913 | Beasley |
| 1,097,824 | A | | 5/1914 | Staten |
| 3,866,652 | A | * | 2/1975 | Ahmad ..................... 152/317 |
| 3,894,973 | A | | 7/1975 | Yunan |

(Continued)

FOREIGN PATENT DOCUMENTS

| GB | 1373155 | * 11/1974 |
| JP | 03060748 | * 3/1991 |
| JP | 04087803 | 3/1992 |

OTHER PUBLICATIONS http://www.mengtyres.com.au/proofing.htm, Tyre Proofing, No More Flat Tyres, 2 sheets, May 21, 2001.
http//www.synair.com/flprf_ind/index.html, Synair Corporation, Flat Proofing Products by Synair Corporation, 2 sheets May 21, 2001.
http://www.synair.com/terms/index.html, Synair Corporation, Glossary products and terms, Synair definition of products and terms, 7 sheets, May 21, 2001.
http://www.synair.com/products/tyrfil/index.html, Synair Corporation Presents TYRFIL a urethane rubber tire filling compound., 14 sheets, May 21, 2001.
http://www.rig–everard.co.uk/everard.html, Everard Ltd Flatproofing specialists, 2 sheets, May 21, 2001.
Arnco Circular, Full of Flatproofing Folklore, Carefree Chronicles & Sealant Solutions, vol. 9, No. 0998, 1998.
http://www.falline.com/polypump.com, Fill Tires in Your Shop with PolyFill Plural Component System, 2 sheets, Jul. 29, 2000.

Primary Examiner—Jeff H. Aftergut
Assistant Examiner—Justin Fischer
(74) Attorney, Agent, or Firm—Banner & Witcoff, Ltd.

(57) ABSTRACT

A tire, and an apparatus and method for forming a tire. The tire may either be a tubed or tubeless tire, and is filled with a mixture of virgin rubber and small rubber pieces. Preferably, a machine grinds the core of used flatproofed tires, or pieces thereof, into a finely communicated pulverulent. The pulverent is mixed with liquid virgin flatproofing material, such as a polyurethane. An injector introduces this mixture, into the core of a tire, typically through a valve. The core of the tire is preferably substantially filled with this mixture. The injector may take the form of one or more elongated screws and the mixing may occur as the ground rubber is being conveyed by the screw.

15 Claims, 8 Drawing Sheets

U.S. PATENT DOCUMENTS

| | | | |
|---|---|---|---|
| 3,922,942 A | | 12/1975 | Fawcett et al. |
| 4,304,054 A | | 12/1981 | Nauck |
| 4,338,840 A | | 7/1982 | Farrell, Sr. et al. |
| 4,416,844 A | | 11/1983 | Wyman |
| 4,451,583 A | | 5/1984 | Chesler |
| 4,970,043 A | * | 11/1990 | Doan et al. .................. 264/237 |
| 5,031,679 A | | 7/1991 | Shoner |
| 5,073,444 A | | 12/1991 | Shanelec |
| 5,133,236 A | | 7/1992 | Dudley |
| 5,238,734 A | * | 8/1993 | Murray .................... 428/295.1 |
| 5,254,405 A | | 10/1993 | Panaroni et al. |
| 5,267,496 A | | 12/1993 | Roach et al. |
| 5,312,573 A | * | 5/1994 | Rosenbaum et al. ........ 264/148 |
| 5,390,861 A | | 2/1995 | Bishop |
| 5,397,818 A | * | 3/1995 | Flanigan ...................... 524/68 |
| 5,402,839 A | | 4/1995 | Gupta |
| 5,478,865 A | | 12/1995 | Chang |
| 5,528,222 A | * | 6/1996 | Moskowitz et al. ..... 340/572.7 |
| 5,611,492 A | | 3/1997 | Hunt et al. |
| 5,634,599 A | | 6/1997 | Khais et al. |
| 5,711,904 A | * | 1/1998 | Eswaran et al. ........... 264/40.7 |

* cited by examiner

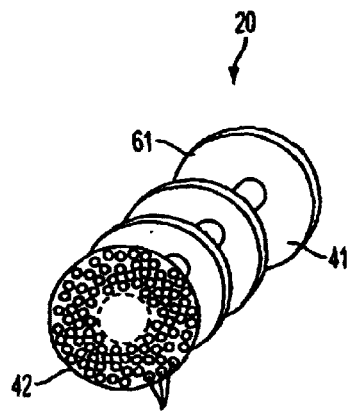
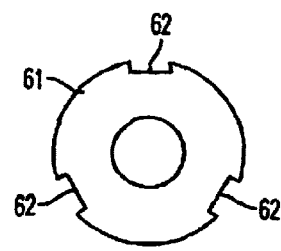
FIG. 4    FIG. 5
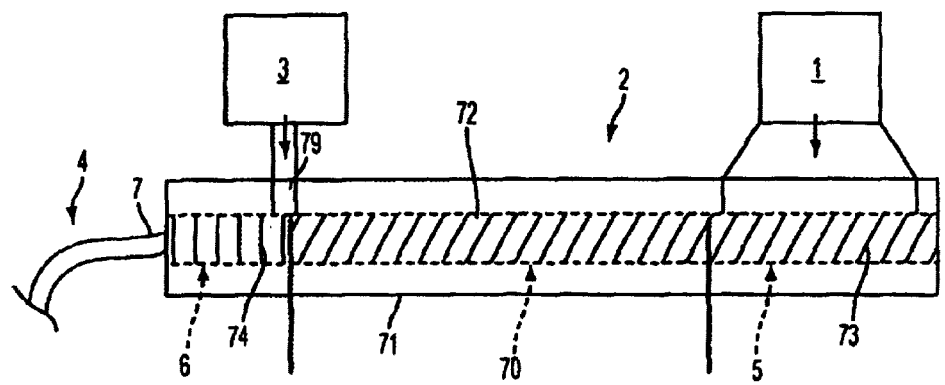
FIG. 6

APPARATUS FOR MAKING TIRES FILLED WITH FLATPROOFING MATERIAL

CROSS-REFERENCE TO RELATED APPLICATIONS

This application is related by subject matter to U.S. patent application Ser. Nos. 09/924,626 and 09/924,536, respectively entitled Method for Making Tires Filled with Flatproofing Material and Tires Filled with Flatproofing Material, filed simultaneously herewith, and which are hereby incorporated by reference as to their entirety.

FIELD OF THE INVENTION

This invention relates generally to a method and apparatus for recycling used flatproofed materials from industrial tires and producing flatproofed tires using the recycled material. More particularly, the present invention concerns a method and apparatus that provides for an input of whole flatproofed tires or shreds or chunks thereof and subjecting the same to a mechanical agitation and compression to alter the generally larger pieces of flatproofed material into finely communicated pulverulent that may be effectively utilized for the manufacture of new flatproofed tires.

BACKGROUND OF THE INVENTION

Conventional pneumatic vehicle tires consist of an outer casing which is given the desired load-bearing capacity and elasticity by air pumped into the casing (tubeless) or into an inner tube fitted within the casing (tubed). Unfortunately, such pneumatic tires are subject to explosive decompression when punctured. Therefore, there has long been needed for a tire and an economical way for producing a tire that would eliminate losing the entire volume of compressed air from within a pneumatic tire when it is punctured.

Methods and apparatuses have been developed to produce a "flatproofed" tire. Liners of various types have been provided in the tire or between an inner tube and the tire casing serving to mitigate the effects of the tire casing being punctured. A more prevalent method for overcoming the problem is to convert pneumatic tires to solid or semi-solid composite tires. Such tires have gained a wide acceptance for certain mining, industrial, and construction uses where the added weight, and different dynamic performance characteristics could be tolerated for permanent protection from flat tires. Until recently, such solid deflation-proof tires have depended on a foamed elastomer filling. Since the foamed filling in such tires is easily flexed, the tires have disadvantages. For example, excessive heat can build-up within the tire and cause the filling to breakdown during service. Filling breakdown reduces the amount of support provided by the foamed elastomeric material potentially causing damage to usually expensive equipment. Therefore, a change from merely using elastomeric material for a filling was required.

Prior to the current invention, a technique for making a flatproofed tire included taking a used flatproofed tire, cutting it into a number of large chunks, placing these chunks into casing of a tire and adding sufficient unused flatproofed material to fill any remaining voids. This method however also has numerous drawbacks. The first drawback is that this procedure can only be used to produce tubeless tires. The second drawback is that this procedure is both labor and time intensive. For example, the used tires have to be manually cut into chunks, those chunks arranged in a casing so as to maximize the shape occupied by the chunks and then an unknown about of new flatproofed material added to fill any voids. In addition to the drawbacks mentioned above, this method produces a tire with inferior properties as the poor bonding of the chunks and new flatproofed material yields a tire that is subject to premature breakdown.

Another method of producing a flatproofed tire currently uses all new flatproofed material. This material is pumped directly into the casing to produce a flatproofed tire. However, this method also has several drawbacks. First a tire produced by this method runs at a relatively high temperature thus leading to breakdown at an increased rate. Second, the input of only pure unused flatproofed material takes a longer time to set-up or cure because the input is at a lower temperature than available when the unused flatproofed material is bonded with large chunks of recycled flatproofed tires. Therefore a process and apparatus that can provide a flatproofed tubeless or tubed tire in a manner that yields a flatproofed tire with superior properties, while reducing the time and labor required in production is needed.

SUMMARY OF THE INVENTION

In accordance with the present invention, there is provided an apparatus for producing a powder like composition of recycled flatproofed material from recycled flatproofed tires. Specifically, the present invention provides a machine that grinds whole used flatproofed tires or large shreds or chunks thereof, into core bits. The apparatus then takes the ground flatproofed tires and mixes the core bits with an amount of one or more virgin flatproofed compositions and injects this combination into either a tubeless or tubed pneumatic tire.

The present invention eliminates many of the problems associated with the prior art methods of recycling flatproofed tires. First, the present apparatus and method can be used with tubeless or tubed pneumatic tires as opposed to the prior art methods that only can produce tubeless flatproofed tires. Second, the present apparatus and method produces flatproofed tires that are more resilient to premature failure because of poor bonding between unused flatproofed material and recycled tire chunks. Third, the present apparatus and method produces a flatproofed tire that has a shorter setup time and is manufactured with less labor than current methods. Fourth, the method and apparatus of the current invention produces a flatproofed tire with superior performance characteristics when compared to flatproofed tires manufactured using either a combination of large chunks of recycled tires and unused flatproofed material or just unused flatproofed material.

In accordance with an aspect of the invention, a system for making a tire with a substantially filled core includes a grinding device capable of grinding cured polyurethane, a mixer capable of mixing ground polyurethane and a liquid virgin polyurethane; and a pump configured to transfer the material mixed in the mixing device into the core of a tire.

In another aspect of the invention, a system for making a substantially filled tire includes a grinder; a mixer that combines the unused flatproofing material to the ground used flatproof pneumatic tires; an injector that injects a mixture of at least one unused flatproofing material into the ground used flatproof pneumatic tires; a pump for transferring the combination of ground used flatproof pneumatic tires and unused flatproofing material from the mixer to a valve; an input device that inputs the combination into a tubed or tubeless pneumatic tire; and a pressure sensor attached to the input device.

In yet another aspect, the present invention includes a system for making a tire with a substantially filled core including a grinding device capable of grinding cured polyurethane, and an elongated rotatable screw device capable of mixing the ground polyurethane and a liquid virgin polyurethane and pressurizing and transferring the mixed material into the core of a tire. The screw device has an input disposed to receive ground pured polyurethane from the grinding device.

BRIEF DESCRIPTION OF THE DRAWINGS

FIG. 4 is an isometric conceptual side view of grinder structure and screen plate for the grinder;

FIG. 5 is a cross sectional view through the grinding structure for the main grinder showing an embodiment of notches;

FIG. 6 is a top view of the second major structural component including an injector/mixer;

DETAILED DESCRIPTION

As used herein, the term "core bits" means discrete particles of cured rubber that have been ground or otherwise reduced in size and having a volume no greater than 1.0 in$^3$. "Ground core bits" refers to "core bits" formed by a grinding process.

As an overview, the invention provides the methods and apparatuses for forming substantially filled tires, and the produced tires themselves. Unless core bit are provided from another source or process, large pieces of cured rubber (which may be from a source that is spent or otherwise used), are ground to form core bits. Distinct compositions for forming a virgin rubber for use as a tire filling compound are mixed together and mixed with the core bits, or mixed together with the core bits. In one exemplary embodiment, the rubber is a polyol, which may be a polyurethane, which in one embodiment may be a toluene diisocyanate or other flatproofing rubber. As used herein, "flatproofing material" is herein defined as toluene diisocyanate and other types of rubber materials exhibiting similar properties to toluene diisocyanate. The mixed combination of the uncured virgin liquid rubber mixed with the core bits is pumped through a wall of a tire casing via a valve stem to substantially fill the region within the tire casing. If the tire to be filled has a bladder, the combination is pumped through the valve stem into the bladder to substantially fill the bladder.

Accordingly, the system 100 for accomplishing these steps includes, in one arrangement, at least one grinding device that grinds cured polyurethane, at least one mixing device that mixes ground polyurethane and virgin polyurethane, and a pump or other input device that transfers the material mixed in the mixing device into the core of a tire.

Figure 1:
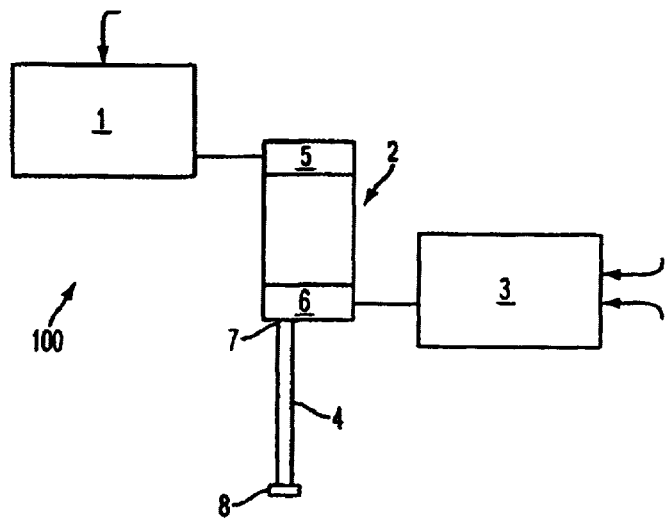
FIG. 1 is a schematic conceptual drawing of the one of the embodiments of the present invention.

Referring now to the drawings and specifically to FIG. 1, one embodiment of the apparatus in accordance with the present invention is shown. To facilitate explanation of the embodiment shown, the sections of the system 100 have been divided into four main structural components. As shown, the first structural component 1 is a main or primary grinder. The second structural component 2 is an injector/mixer and optionally includes a second or secondary grinder. The primary grinder 1 and the injector/mixer 2 are located such that the output material from the primary grinder 2 is collected and transferred to an input area 5 of the second structural component 2. The third main structural component 3 includes a mixer that mixes at least two reactive portions to form the virgin liquid rubber. The output of the mixer 3 is fed into the secondary structural component 2 where the virgin liquid rubber is mixed with the ground rubber. The output of the second structural component 2 is transferred to the fourth main structural component 4 at transfer point 7. Structural component 4 is an adaptor having an output 8 that can be attached to various sizes of tubed or tubeless pneumatic tires so that the pressurized mixture of virgin liquid rubber and the ground rubber, e.g., core bits, can be introduced into the core of the tire to be filled.

Figure 2:
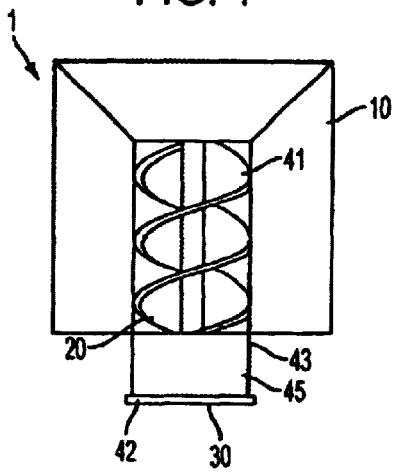
FIG. 2 is a top view of the first structural component of the present invention in the form of a main or primary grinder.
Figure 3:
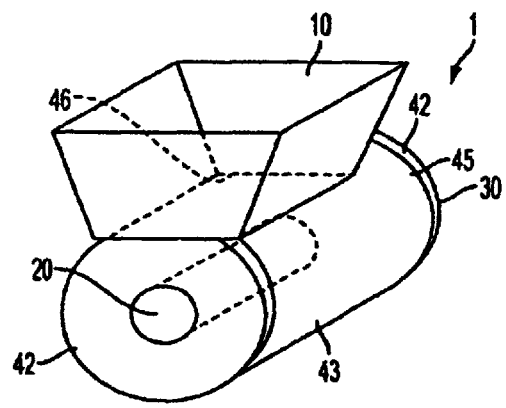
FIG. 3 is an isometric view of the first structural component of the present invention in the form of a main or primary grinder.

The first structural component 1 receives the rubber or used flatproofing material to be recycled, and is shown in more detail in FIGS. 2 and 3. The first major structural component can generally be thought of as a grinder 1 or primary grinder and will be referred to as such herein. This system is described assuming that the rubber to be supplied to the grinder 1 is used flatproofing material being recycled. However, it is recognized that the rubber being introduced into the grinder 1 need not be used. Generally, the grinder 1 includes an input section 10 that may take the form of a hopper, a rubber grinding apparatus 20 suitable for grinding the rubber deposited in the hopper 10, an output section 30 from which ground rubber exits the first component 10, and a motor 9 or other power source that provides power for the grinding apparatus 20. At least the portions of the grinder 1 in contact with the rubber to be ground and the ground pulverulent are composed of material that is chemically inert to used flatproofing material.

The hopper 10 is designed to handle large pieces of used flatproofing material. The rubber that is placed in the hopper 10 may be large chunks or pieces of new or used flatproofing material and may be of any size or weight as long as the size of the used flatproofing material does not exceed the size of the hopper 10. Loading of the pieces of rubber into the hopper 10 may be accomplished manually or by any desired conveying device. Preferably, however, these large pieces are of a size and mass suitable for the lifting and transferring by a single adult human. The hopper 10 is preferably sized and shaped to maintain a number of these rubber pieces at any given time.

The input section 10 of the grinder 1 is located where the large pieces of used flatproofing material are transferred to the grinding apparatus 20 can be accomplished using methods known to those of ordinary skill. Preferably, the input section 10 of the grinder is physically located so that the output of the input section 10 is located directly above the grinding apparatus 20. This provides a gravity-assist feed from the hopper 10 to the grinding apparatus 20. Preferably, the design of the hopper 10 is designed in an inverse conical or tapered shape. This design permits a large area for input of the large pieces of used flatproofing material while maintaining the ability to hold a number of rubber pieces. The inverse conical or tapered shape also allows provides a good interface to the grinding apparatus 20 using known methods.

The grinding apparatus 20 may be any apparatus suitable for grinding used flatproofing material. The grinder 20 may include any desired arrangement that have the capability of shearing, cutting or otherwise decreasing the size of the used flatproofing material via physical methods. As seen in FIGS. 2–4, the grinding apparatus 20 includes an elongated screw 41, a generally cylindrical housing 43 around the bottom and sides of the screw 41, and a screen plate 42. Even more preferably, the elongated screw 41 is designed in a manner to have no sharp edges. The screw 41 is supported in any desired manner, such as by bearings, and coupled to and driven by a motor 9 in any manner known to those of ordinary skill.

The screw 41 conveys the chunks of the used flatproofing material to a forward end section 45, and to and forceably against, the screen plate 42 that is positioned at the forward end of the housing 43. During this conveying process, the pieces of rubber will be reduced in size in part due to the rubber pieces being sliced due to the clearance between the screw 41 and the housing 43 on the bottom and sides below the hopper 10, and by the bottom edge 46 of the front wall of the hopper 10 immediately before the forward end section 45. The conveyance of the rubber material into the forward end section 45 develops a pressure in the material in that section and the material is forced against the screen plate 42.

The screen plate 42 contains a number of holes 51, the number and size of which is a matter of design choice. As seen in FIG. 4, the screen holes 51 of screen plate 42 are preferably of sufficient size and dimension to produce used irregularly shaped flatpoofing material with an average diameter of ½ inch or less. Preferably, the size and number of the screen holes 51 are sufficient to produce ground used irregularly shaped flatproofing material with an average diameter of from about ¼ to ½ inch, wherein the average volume of the irregularly shaped pieces is about equal to the volume of a sphere with a ¼ inch diameter. Even more preferably, the size and number of the screen holes 51 are sufficient to produce ground used flatproofing material with an average diameter of about ⅜ inch. Alternatively, this grinding process produces core bits of any desired size preferably less than 1 cubic inch. In other embodiments, it produces core bits having an average size of less than 0.125 cubic inches and/or less than 0.0156 cubic inches, and/or produces core bits having an average particle size between 0.125 cubic inches and 0.000244 cubic inches.

As seen in FIG. 5, the continuous blade 61 of screw 41 is preferably periodically notched to decrease back pressure by allowing back flow of used flatproofing material that does not pass the screen plate. The number of the notches 62 in the blade 61 in each revolution is generally a function of design and operating conditions. If used, the number of notches 62 is preferably within the range of 1 to 10 in each section of the blade 61. Even more preferably, the number of notches 62 ranges from 2 to 5. Most preferably, the three notches 62 are provided. The notches 62 may have any desired size and shape. While preferably the notches 62 are rectangular in shape, the notches 62 can be of any geometric size or shape so long as they perform the function of decreasing pressure on the grinding apparatus 20 by allowing back flow from screen plate 42.

The used flatproofing material forced against the screen plate 42 by the screw 41 causes a grinding action to grind the used flatproofing material therethrough producing "core bits". Once the core bits pass through screen plate 42, they are transferred from the grinder 1 to the second major structural component 2. The transfer of this material may take place via any method known. Examples of these known methods include; gravity transfers, pressure transfer via piping components, and collection into bulk transfer casings and manual or automated transfer thereof to the second major structural component 2. Preferably, the transfer of the primarily ground material from the original grinder is a gravity transfer wherein the input area 6 of second major structural component 2 is located in a manner such that the output from the grinder is vertically above the input area 6 of the second major structural component 2 and gravity can act on the ground output material to transfer this output material to the second major structural component 2. A structural channel 21 (FIG. 14) may be used to help guide the core bits to the second component 2.

In lieu of, or in addition to the screw conveyor and fixed screen plate forming the grinder 1, the grinder 1 may include a linear force conveyor and a rotating screen plate (similar in concept to a food processor), two or more rotating drums with external teeth, or one or more drums and a static plate with external teeth.

Figure 7:
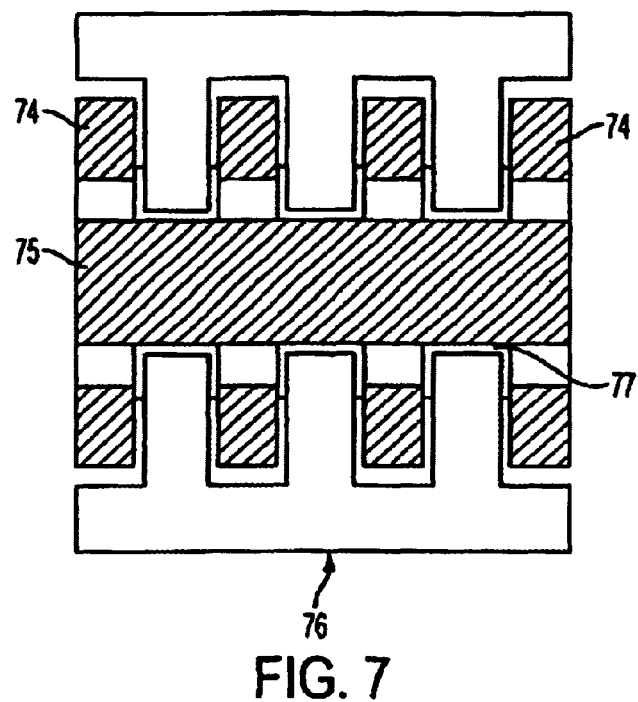
FIG. 7 is a schematic sectional view of the mixing section of the rotating conveyor in the injector/mixer.
Figure 8:
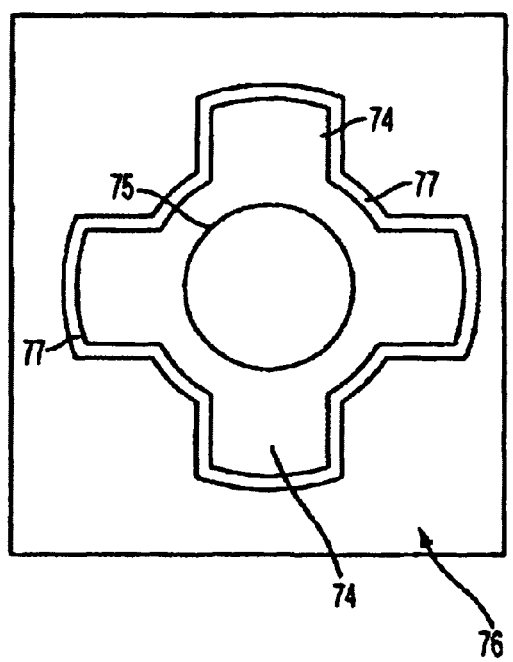
FIG. 8 an end view of a mixing section of the rotating conveyor in the injector/mixer.

As seen in FIGS. 6–8, the second major structural component 2, which will be referred to herein as an injector/mixer, includes three zones. The first of these zones is the input zone 5 that receives the core bits from the grinder. The second of these sections is a pressurizing zone 70 that increases the pressure of the core bits within the injector/mixer 2. The third section is the mixing zone 6 that mixes the pressurized core bits with virgin liquid rubber. The injector/mixer 2 then pumps this mixture under pressure through the adaptor 4 for introduction into the core of a tire. Any desired apparatus and/or combination of apparatuses that can be utilized to obtain this result.

In an exemplary arrangement, one or more rotating screws 72 are utilized to help achieve the results desired from the three zones. This screw 72 is provided within a casing 71. The screw 72 and casing 71 preferably extends through all three zones of the second major structural component 2. The screw 72 and the casing 71 can be made of any known material, including but not limited to plastics, metals, and non-metals. Preferably, they are comprised of material chemically inert to the ground material being transferred to the injector/mixer 2.

In the input zone 5 of the injector/mixer 2 is designed in a manner sufficient to receive and hold the core bits transferred from the grinder 1. In the preferred embodiment, at least the input zone 5 of the casing 71 is devoid of a top plate or an opening is otherwise provided in the top of the casing in the input zone 5 so that when it is placed below the output of the grinder 1, the core bits passing through the screen plate 42 can be gravity fed into the casing 71.

As schematically illustrated in FIG. 6, the screw 72 has blades 73 thereon. The blades 73 are initially configured to convey the received core bits from input zone 5 to pressurizing zone 70. To achieve this, the screw 72 in this input zone 5 may, but need not, include a continuous blade 73 so as to function like an auger. This conveys the received core bits from the input zone 5 to the pressurizing zone 70.

The second zone 70 contains an apparatus or combination of apparatuses to further develop pressure in the ground material. As further described above, preferably, the second section 70 of the second major structural component 2 contains both the casing 71 and the rotating screw 72 described above. The second zone 70 further develops a pressure in the ground rubber material in preparation for admixing this ground material with a liquid.

The portion of the screw 72 in the second zone 70 preferably includes a portion with a continuous conveying blade 79 similar to the first zone 5 for conveying the core bits to the final or mixing zone 6. However, in this pressurizing zone 70, the casing 71 around the screw conveyor 70 is fully enclosed. The advance of the core bits into the sealed casing 71 inherently causes an increase in pressure as the region is enclosed and the rubber core bits are unable to flow backward. This zone 70 thus develops a desired pressure in the core bits.

The third section 6 of the second major structural component 2, preferably contains the casing 71 and at least one apparatus that can appropriately admix the pressurized ground material from the second section 70 and liquid material input from the third major structural component 3. Appropriate mixing requires that substantially all the pressurized ground material is substantially coated with the liquid material. Preferably, as herein described above, the apparatus is at least a rotating screw 72. The third zone 6 further contains an input section 79 connecting the third major structural component 3 to the third zone 6 so that the third zone 6 can receive liquid virgin rubber from the third major structural component 3.

The portion of the screw 72 in the third zone 6 may also include a plurality of straight blades 74 extending perpendicularly from the shaft 75. As shown in FIGS. 7 and 8, fixed structure 76 is preferably positioned between the spaced blades 74 and attached to the casing 71. When the angular position of the shaft 75 is in predetermined positions, relative to the fixed structure 76, small clearances 77 are provided between the blades 74 and the fixed casing structure 76. The clearances 77 provide a reduced flow area. The core bits and the virgin rubber are mixed together and the resulting mixture moves through the clearances 77 between the rotating blades 74 and the fixed structure 76. This arrangement assists in ensuring a complete mixing of the core bits from the grinder 1 and the liquid virgin material from the third major structural component 3. Further, in this region, the virgin liquid material will coat the core bits, which will in turn soften the core bits.

The length of each zone 5, 70, and 6 is a design choice for those of ordinary skill based on the specific configuration of each system and other factors such as the volume of mixture being provided per unit time, and the sizes of the core bits and conveyor components. In a preferred arrangement, each of these zones 5, 70, and 6 have a length in the range between 4 and 20 inches. Preferably, the lengths of the conveyor in the first two zones are between 6 to 10 inches, and the length of the conveyor in the last zone 6 is between 4 to 6 inches. However, it is recognized that these ranges are merely preferred and the zones may be any desired length. Additionally, the rotating shaft and blades of the screw conveyor 72 is supported in any desired manner, such as by bearings, and coupled to and driven by a motor 79 in any manner known to those of ordinary skill.

If desired, secondary grinding of the core bits can be performed in any or all of the zones 5, 70, and 6 of the injector/mixer 2. First, some of the core bits in the mixing zone 6 may inherently be ground into smaller bits due to being forced through the reduced clearance space 77. Additionally, if desired small flexible metal fingers, not shown, may be added to blades 74 and/or the fixed structure 76 that define the bounds of the clearance passageway 77. The small metal fingers act as stators to further grind the core bits into smaller core bits, and when located in the mixing zone 6, serve to further promote mixing of the core bits and the virgin liquid rubber. However, if desired, a section of the continuous blade 73 and/or 74 in the input zone 5 and/or the pressurizing zone 70 may be replaced by this type of arrangement to further grind the core bits from the main grinder 1.

Figure 9:
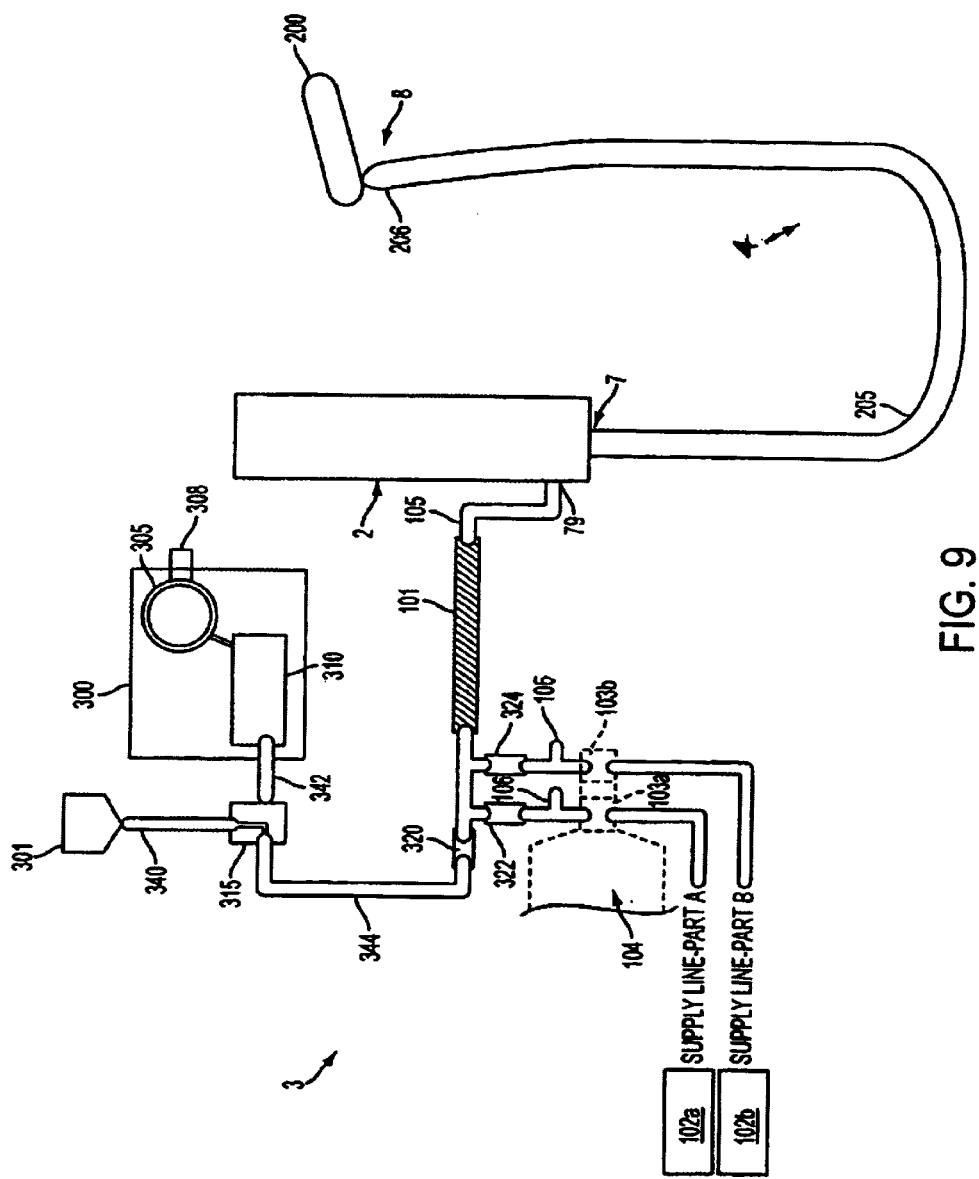
FIG. 9 is a schematic view of the third major structural component for forming the virgin rubber and supplying the virgin rubber to the injector/mixer, and its cleaning system.

As seen in FIG. 9, the an exemplary embodiment of the third major structural component 3 preferably includes two separate sources 102a and 102b of chemically distinct compositions for making virgin flatproofing material when mixed, a mixing apparatus 101, transfer components 105 such as pipes, tubes, conduits, or troughs, for fluidly coupling liquid material from the mixing apparatus 101 with the beginning of the third zone 6 of the injector/mixer 2.

The sources 102a and 102b may take the form of separate containers 102a and 102b. Each of the holding containers 102 is preferably comprised of a material chemically inert to the material contained therein. Any desired flatproofing material may be used. Conventional unused flatproofing material is commercially available from numerous sources, including, but not limited to: Arnco Corporation; and Synair Corporation. At conventional room temperature and pressure, this flatproofing material is in the liquid phase. The characteristics of conventional unused flatproofing material are well known to those of ordinary skill. While mixing of separate components of the flatproofing are preferably separately provided and mixed, premixed flatproofing material may be provided if desired in lieu of the illustrated arrangement.

The unmixed portions of the flatproofing materials are transferred to the mixer 101 via any conventional metering and pumping devices. In an exemplary embodiment, metering pumps 103a and 103b may be used and the pumps 103a and 103b may be coupled to a common motor 104. If desired pressure sensors 106 may be provided in line to provide a controlled feedback to the metering pumps 103a and 103b to ensure the desired delivery proportions to the mixer 101.

The mixing apparatus 101 is an apparatus suitable for mixing one or more input streams of various unused flatproofing compositions. As with all other components of the system, the mixing apparatus 101 is preferably constructed of material chemically inert to any of the unused flatproofing compositions that it receives as input as well as chemically inert to the mixed stream that outflows from the mixing apparatus 101. Any suitable mixing apparatus 101 may be used and alternatives are well known to those of ordinary skill. The mixing apparatus 101 preferably takes the form of a static mixer. However, an alternative mixing arrangement may be used if desired.

The output from the mixing apparatus 101 is transferred to flatproofing material inlet 79 in the third zone 6 of the mixer/injector 2 by transfer components 105. Transfer components 105 are any type of transfer components well known in the art for transferring a liquid phase material from one point in a system to another point. Examples of such transfer components include pipes, troughs, and conduits. Regardless of the actually transfer components 105 used, the transfer components 105 are be constructed of a material chemically inert to the output stream of unused flatproofing material from mixing apparatus 101.

In an alternative, not shown, the output from the mixer 101 may be provided with multiple output streams. According to this embodiment, a first output may be coupled to the third zone 6 of the injector/mixer 2 to mix the virgin liquid flatproofing material with the core bits. The other output could be coupled downstream from input 79, either in the injector/mixer 2 or in the adapter 4, to mix the mixture of the mixed core bits and virgin liquid rubber with additional virgin liquid rubber. In this embodiment, the relative percentage of output quantities from mixer 101 can be manually or automatically controlled to provide multiple streams containing any percentage of the total output from mixer 101. Any desired manual or automatic controls can be used to perform this function.

Figure 10A:
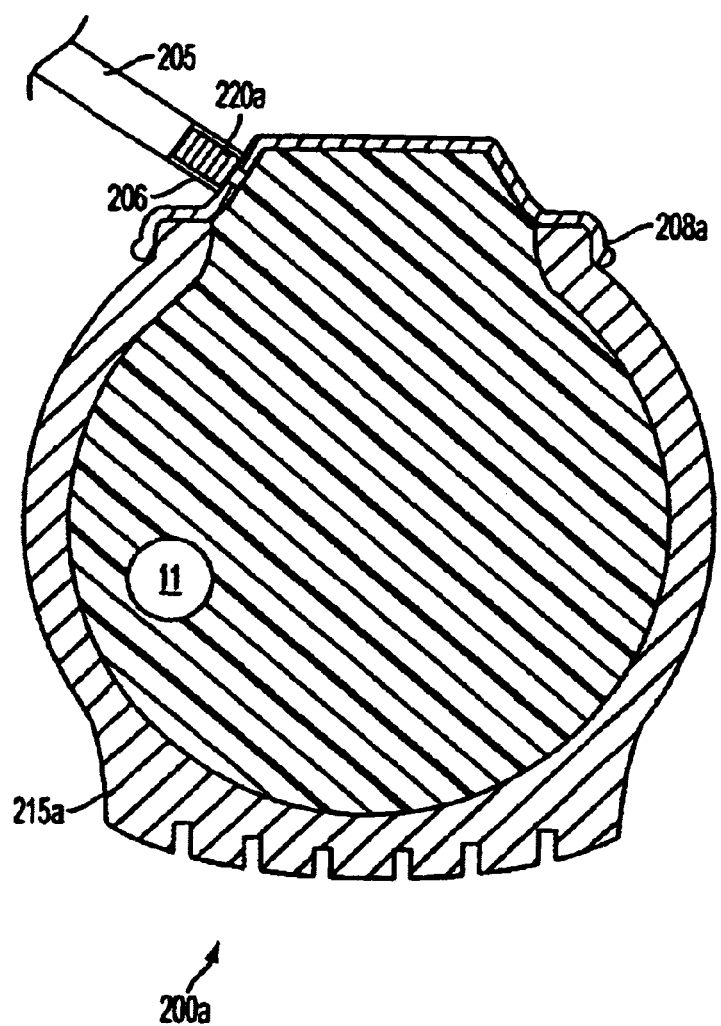
FIG. 10a is a partial sectional view of the fourth major structural component coupled to a tubeless tire.
Figure 10B:
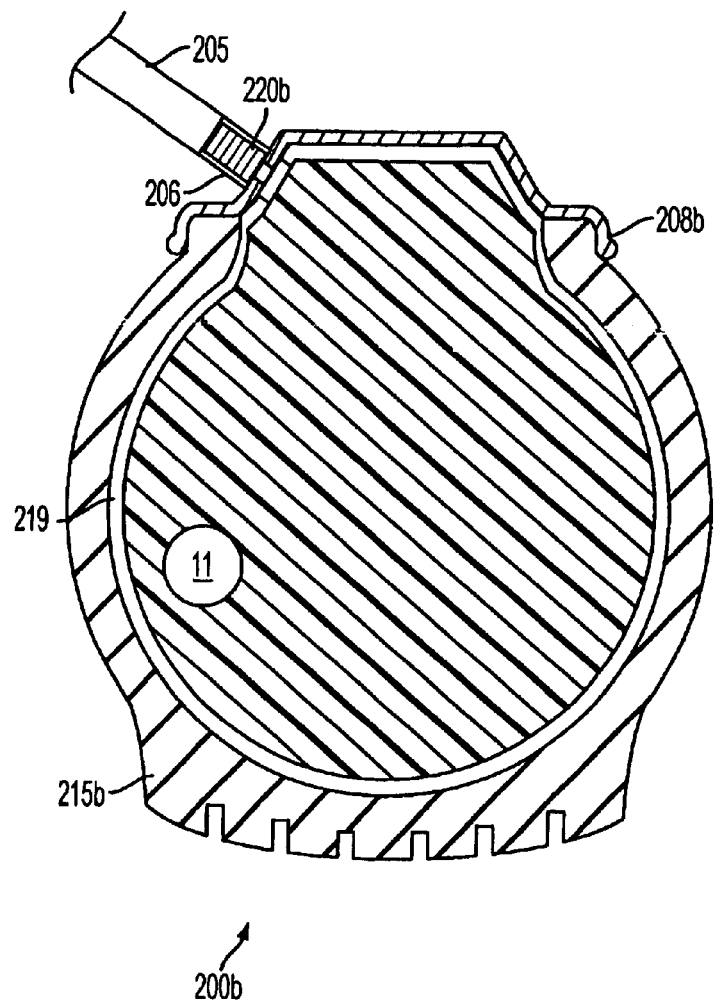
FIG. 10b is a partial sectional view of the fourth major structural component coupled to a tubed tire.

The fourth major structural component 4, alternatively referred to herein as an adapter, fluidly couples the output of the injector/mixer 2 to the tire 200, that may be either a tubeless tire 200a (FIG. 10a) or tubed tire 200b (FIG. 10b).

The output of the second structural component 2 is transferred to the input of fourth main structural component 4 at transfer point 7. The fourth structural component 4 includes a conduit 205, which may be flexible tubing that is coupled to the mixer/injector 2 by any suitable arrangement. The other end 8 of the conduit 205 includes an adaptor coupling 206 that can be attached to various sizes of tubed or tubeless pneumatic tires 200. This permits the pressurized mixture of virgin liquid rubber and the ground rubber to be introduced into, and substantially fill, the core of the tire 200, via conduit 205. Preferably, this adaptor coupling 206 is threaded or otherwise designed to prevent separation during the fill process. All components of the fourth major structural component 4 are constructed by materials chemically inert to any material input or output.

The adapter coupling 206 can be of any suitable design, size, and shape to interface with an input device, such as a valve stem, to the tire 200. Typically, the adapter coupling 206 can vary in size from the smallest size of a standard valve assembly typically used for pumping air into tires (approximately 1/16 of an inch) up to a diameter of 3 inches. Preferably, the diameter of the adapter coupling 206 is from about 1/16 to about 1 inch. Even more preferably, the diameter of the adapter coupling 206 is from about 1/16 to about 1/2 inch. Most preferably, the diameter of the adapter coupling 206 is from about 1/16 to about 1/4 inch.

As can seen in FIG. 10A, a tubeless tire 200a may have a rim 208a, a valve stem 220a (preferably secured to the rim 208a), and a tire casing 215a. As can seen in FIG. 10B, a tubed tire 200b may have a rim 208b, a valve stem 220b (preferably secured to the rim 208b), a tire casing 215b, and an internal bladder 219. The core of the tires 200 is the region that tubed and tubeless tires are normally filled with air. Thus, in the tubeless tire of FIG. 10A, the core 218a is the region inside of the casing 215a and bounded in the center by the rim 208a. Similarly, in the tubed tire of FIG. 10B, the core 218b is the region inside of the casing 215b and bounded in the center by the rim 208b, and more specifically, is the region inside of the bladder 219. The valve stem 220a/220b provides a passageway through into the core 218a/218b. The valve stem 220 may be standard commercially available products or may be designed specifically for such an application.

Figure 11:
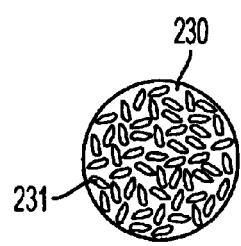
FIG. 11 is an enlarged view of Detail 11 of FIGS. 10a and 10b.

In FIG. 11, which is an enlarged schematic view of the identified regions in the core of the tires 200 of FIGS. 10a and 10b, it can be seen that the mixture that has filled or substantially filled the core includes the virgin rubber material 230 and the ground core bits 231.

The mixing of the virgin rubber material 230 and the core bits 231 is preferably done at, and/or results in a mixture that is, approximately 110 degrees Fahrenheit. This mixture of material is pumped into the tire until the tire pressure reaches an OEM level set for that tire. Typically, this OEM level is approximately eighty (80) pounds per square inch (psi). However, any desired pressure may be used.

During the process of pumping this mixture into a tire, the tire may need to be punctured to release the buildup of air pressure due to air compression by the input mixture. Thus, the inputting apparatus may be provided with a sensor 125 that detects when the requisite OEM level is reached. This sensor then provides a signal to the user or automatically shuts down the filling of the tire. Any type of sensor known to those of ordinary skill suitable for detecting a specified pressure is used in the current invention. Preferably, a piezo pressure sensor is used.

After the tire 200 is filled with the material mixture, it is set aside for a time period for the mixture to set-up or cure. Typically the time necessary for this curing is from about 24 to about 30 hours, which may be shorter than the curing time for other methods of the prior art.

If desired, the system 100 may also be provided with a cleaning system to clean the lines in the mixing device 3, the section 6 of the mixer injector 2 where the virgin rubber 203 is mixed with the core bits 231, and the fourth structural component 4 (e.g., the conduit 205 and the adaptor coupling 206). The cleaning system also preferably permits air purging and fluid cleaning, and in operation, preferably but not necessarily, both are performed. The cleaning system includes a three-way valve 315 for selecting between the air purging system and the fluid cleaning system, check valves 320, 322, and 324 for preventing the simultaneous operation of the cleaning/purging system and the mixer 3 when the metering pumps 103a and 103b are in use, and a line 344 for fluidly coupling the three-way valve 315 to the cleaning system check valve 320. The check valves 320, 322, and 324 are preferably automatic. The three-way valve 315 may be manually or electronically controlled.

The air purging system includes a pressurized air source 301, and a line 340 fluidly coupling the air source 301 to the three-way valve 315 cleaning tank 300. The pressurized air source 301 may be controlled by a motor 302 or any other powered device. When the system is through its filling operation and cleaning is desired, the coupling adapter 206 is disconnected from the tire 200 and is placed into a trash receptacle (not shown) or other receiving device. The three-way valve 315 is controlled to accept air from the pressurized air source 301 and the pressurized air source 301 is activated. The pressurized air travels through line 344, and through the system from check valve 320 to the injector mixer 2 cleaning the remains of the virgin mixture in the lines and in the mixer 101. The pressurized air will also purge the section 6 of the mixer injector 2 where the virgin rubber 203 is mixed with the core bits 231, the conduit 205 and the adaptor coupling 206. Any rubber and dirt remains will exit the coupler adapter 206 and be discharged into the receptacle.

The fluid cleaning system includes a tank 300, a pump 310 coupled to the tank 300, and a line 342 fluidly coupling the tank 300 to the three-way valve 315 via the pump 310. In an exemplary embodiment, the pump 310 is an air powered diaphragm pump. The tank 300 preferably also includes a return coupling 308 and a filtered inlet 305 to the tank 300. When the air purging has been completed, and if fluid cleaning is desired, the coupling adapter 206 is taken from the trash receptacle and is connected to the return coupling 308 at the tank 300. The three-way valve 315 is controlled to accept fluid from the tank 300, via pump 310, and the pump 310 is activated. This pressurized fluid follows the same path as the air cleaning the line with any desirable cleaning solvent, such as an alcohol. When the fluid reaches the return coupling 308, it is filtered at 305 to maintain the desired level of purity in the cleaning fluid. Thus, as the same cleaning fluid is returned to the tank 300, a closed loop cleaning system is provided. However, if desired, the system could be open and the used fluid may be discarded or otherwise processed and reused. Once the system has been cleaned, the pump 310 may be shut off to await the next activation of the tire filling system. Cleaning may be done after a certain number of hours of use or may be done periodically, such as once a day.

Figure 12:
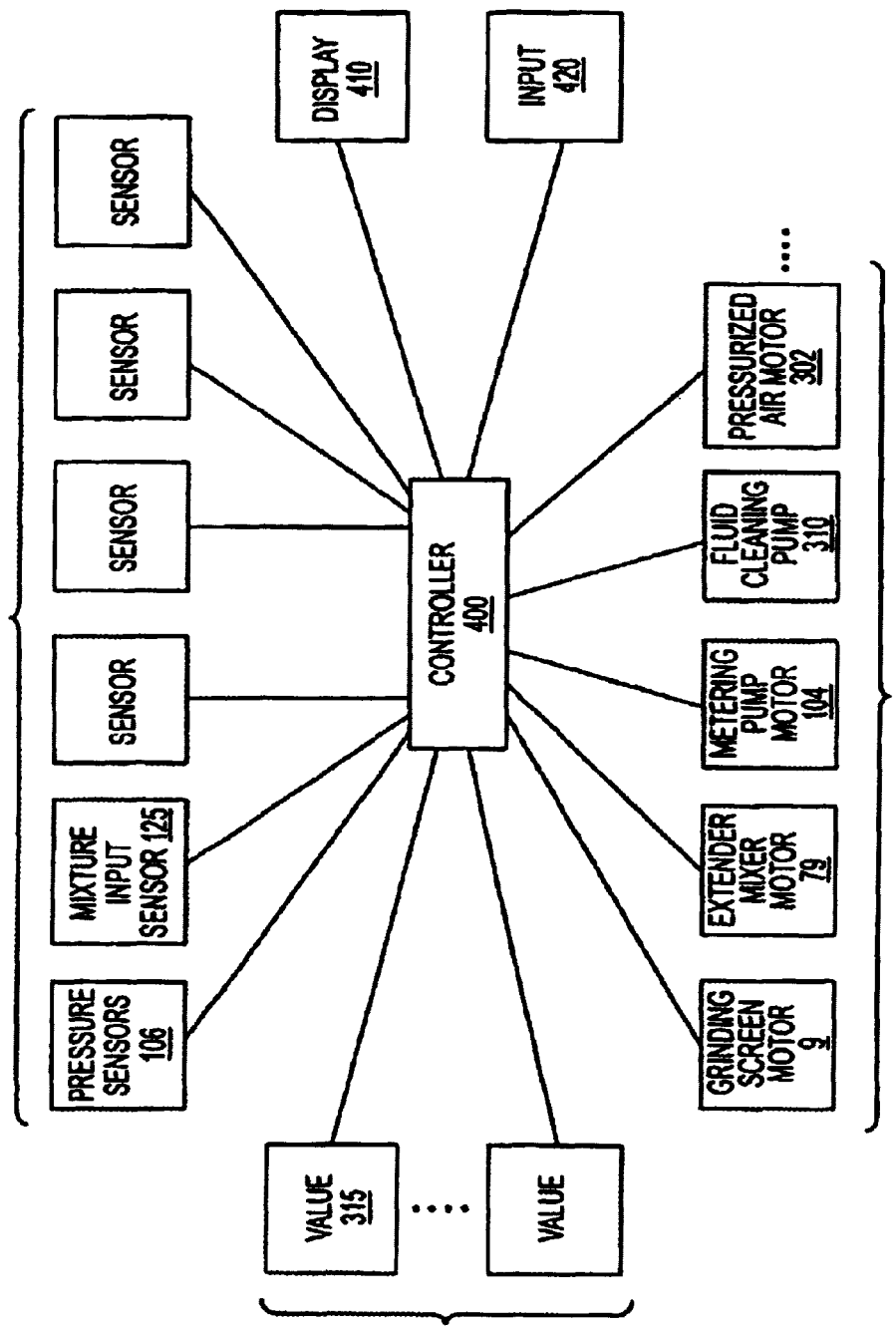
FIG. 12 is a schematic of the control system.

Referring to FIG. 12, while the components of the system 100 may be separately controlled, an exemplary embodiment includes a common controller 400 for partial or total automated use. The controller 400 may take the form of any desired electrical processing unit, such as a computer, and may further have one or more displays 410 and one or more input devices 420 such as switches, mice, touch sensitive panels, etc. The controller 400 is also preferably coupled to all the remotely controlled valves, the sensors, and the different powered devices such as motors and pumps. The appropriate control software for running the apparatus of the current invention may be used and the selection of the appropriate control system is a matter of design choice based on the desired parameters. Thus, feedbacks from the sensors may be used to regulate the operation of the valves and the other powered devices.

Figure 15:
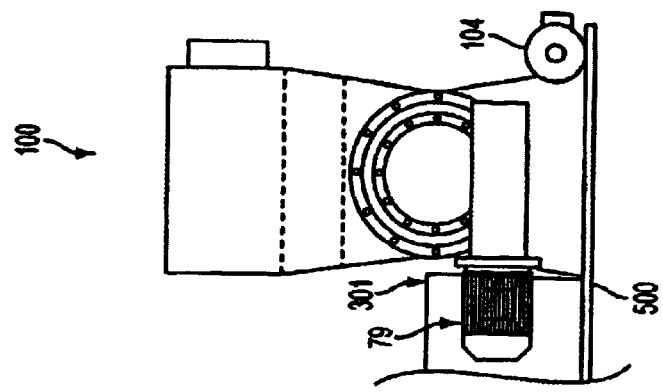
FIGS. 13–15 are front, side, and rear elevational views of an embodiment of the present system shown as coupled to a common frame.
Figure 14:
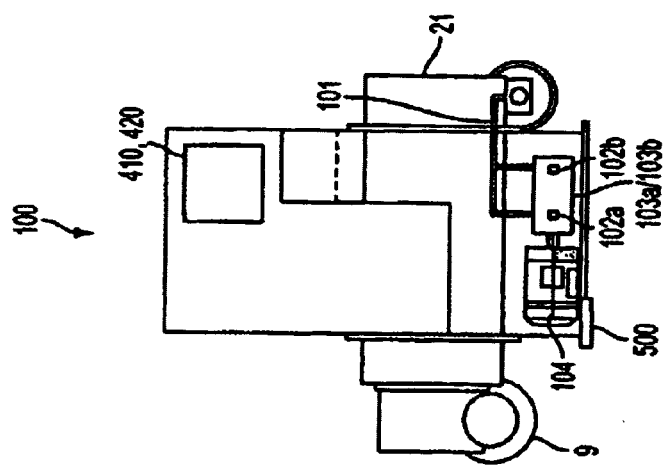
Figure 13:
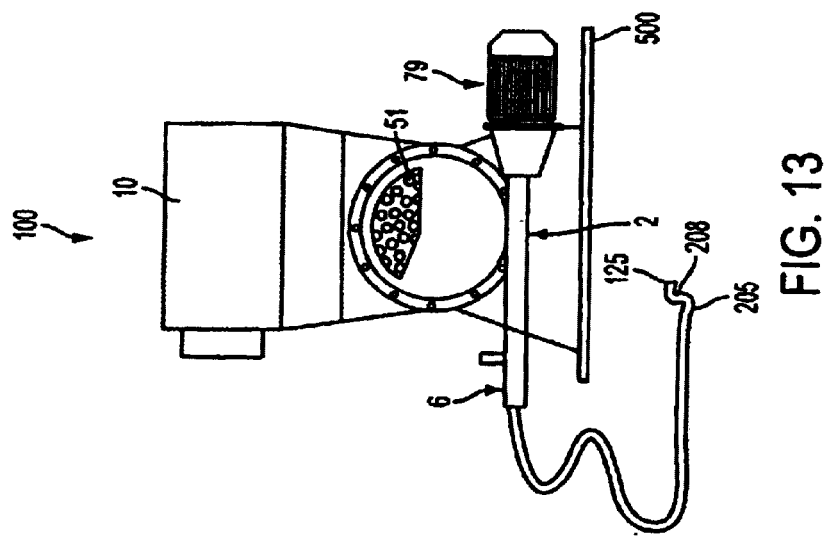

Various elevational views of an exemplary physical embodiment of the system 100 are included as FIGS. 13–15. As can be seen in the figures, the grinder 1, the mixer/injector 2, and the virgin material mixer 3 may all be structurally coupled to each other and supported by a common frame 500. Exemplary physical configurations for schematic elements are also included and designated by the reference numerals of their respective schematic element.

Thus, a tire produced using the above-described method and apparatus is filled with a mixture of the ground recycled flatproofing material, e.g., the core bits, and at least one virgin flatproofing material. Further, the core of the tire of the present invention is generally filled with a sufficient amount of the described mixture so that approximately at least 90 percent of its volume is occupied by the mixture. Preferably, the amount of the mixture occupies at least 95 percent of the volume of the core of the tire. Even more preferably, the amount of mixture occupies at least 99 percent of the tire's volume.

The mixture that fills the tubed or tubeless pneumatic tire is generally comprised of approximately equal portions of ground and unused material. Preferably, the mixture comprises of at least 60 weight percent ground material and 40 or less weight percent virgin material. Even more preferably, the mixture is a mixture from about 65 or 75 to about 90 weight percent ground material and from about 10 to about 25 to 35 weight percent virgin material.

Additionally, the system does not require an initial grinder or the method a step of grinding rubber. Accordingly, the system may accept preprocessed core bit directly into the injector/mixer 2. Thus, an aspect of the invention includes mixing virgin rubber in any form as described herein with core bits, and introducing such a mixture into the core of a tire.

While exemplary systems and methods embodying the present invention are shown by way of example, it will be understood, of course, that the invention is not limited to these embodiments. Modifications may be made by those skilled in the art, particularly in light of the foregoing teachings. For example, each of the features of the aforementioned embodiments and examples may be utilized in combination with other embodiments.

I claim:

1. A tire cavity filling system comprising:
   a grinding device capable of grinding cure polyurethane into core bits, having an outlet;
   an elongated rotatable screw device for mixing core bits and a liquid virgin polyurethane and pressurizing and transferring the mixed material into the core of a tire, said screw device disposed adjacent to said grinding device and having an input attached to said grinding device outlet to receive core bits from the grinding device; and
   a controller electronically coupled to the grinding device and the elongated screw device.

2. The system of claim 1 further comprising at least one holding tank for at least one unused flatproofing material, a transfer component connecting each holding tank to the a mixing device and a transfer apparatus connecting the mixing device to the elongated rotatable screw device.

3. The system of claim 1 wherein said grinding device is capable of producing core bits with an average diameter of less than 0.125 inches.

4. The system of claim 1 wherein said grinding device is a fine grinder, said system further comprising a coarse grinder, said fine grinder disposed to receive ground polyurethane from the coarse grinder.

5. The system of claim 1 wherein said elongated rotatable screw device is subdivided into three sections.

6. The system of claim 5 wherein material from said grinding device is fed into the first of the three sections.

7. The system of claim 5 wherein the first and second sections are used to develop a pressure in the ground material.

8. The system of claim 5 wherein the third section additionally comprises an input device for at least a single stream of unused flatproofing material.

9. The system of claim 5 wherein the third section additionally comprises multiple input devices for multiple streams of unused flatproofing material.

10. The system of claim 1 further comprising a sensing device electronically coupled to said controller.

11. The system of claim 1 further comprising a puncturing device electronically connected to said controller for relieving excess tire pressure.

12. The system of claim 1 wherein said elongated screw device is notched.

13. The system of claim 1 further comprising a cleaning device connected to said grinding device and said elongated screw device.

14. The system of claim 13 wherein said controller is electronically connected to said cleaning device.

15. The system of claim 2 wherein said controller is electronically connected to said mixing device.

* * * * *